United States Patent
Petrovic

(10) Patent No.: US 7,198,147 B2
(45) Date of Patent: Apr. 3, 2007

(54) CONVEYOR UNIT WITH ACCUMULATION OF RECEPTACLES SUCH AS BOTTLES

(75) Inventor: Zmaj Petrovic, Mundolsheim (FR)

(73) Assignee: GEBO Industries, Societe Anonyme, Reichstett (FR)

( * ) Notice: Subject to any disclaimer, the term of this patent is extended or adjusted under 35 U.S.C. 154(b) by 0 days.

(21) Appl. No.: 10/510,330

(22) PCT Filed: Apr. 11, 2003

(86) PCT No.: PCT/FR03/01148

§ 371 (c)(1),
(2), (4) Date: Apr. 7, 2005

(87) PCT Pub. No.: WO03/086916

PCT Pub. Date: Oct. 23, 2003

(65) Prior Publication Data

US 2005/0178640 A1    Aug. 18, 2005

(30) Foreign Application Priority Data

Apr. 12, 2002   (FR) ................................. 02/04592

(51) Int. Cl.
*B65G 47/68* (2006.01)
(52) U.S. Cl. .................... 198/452; 198/457.05
(58) Field of Classification Search ........ 198/452–454, 198/457.05, 418.7, 447
See application file for complete search history.

(56) References Cited

U.S. PATENT DOCUMENTS

| | | | | |
|---|---|---|---|---|
| 3,104,753 A | * | 9/1963 | Osborne | 198/447 |
| 3,240,311 A | * | 3/1966 | Hofer et al. | 198/443 |
| 4,356,908 A | * | 11/1982 | Embro, Jr. | 198/461.3 |
| 4,401,207 A | * | 8/1983 | Garvey | 198/580 |
| 4,976,343 A | * | 12/1990 | Fuller | 198/453 |
| 5,760,343 A | * | 6/1998 | Arimoto et al. | 177/25.18 |
| 5,788,053 A | * | 8/1998 | Glawitsch | 198/453 |
| 5,918,723 A | * | 7/1999 | Schuitema et al. | 198/347.4 |
| 6,168,005 B1 | * | 1/2001 | Petrovic | 198/347.4 |
| 6,269,933 B1 | * | 8/2001 | Schuitema et al. | 198/446 |
| 6,575,287 B2 | * | 6/2003 | Garvey et al. | 198/418.6 |
| 6,612,417 B2 | * | 9/2003 | Garvey | 198/443 |
| 6,622,847 B2 | * | 9/2003 | Schuitema et al. | 198/399 |

* cited by examiner

*Primary Examiner*—Douglas A. Hess
(74) *Attorney, Agent, or Firm*—Egbert Law Offices

(57) ABSTRACT

A conveyor unit with accumulation of receptacles, such as bottles, includes an accumulation table onto which a feed conveyor opens out upstream, whilst downstream, the table supplies receptacles onto a passive aligner for leading the above in single file to a processing unit downstream. Furthermore, the passive aligner runs parallel to the accumulator table, the above having, in the downstream extension thereof, a transfer conveyor, on which receptacles are pushed laterally by a guide rail towards the passive aligner onto an adjacent transport conveyor running in the opposite sense which becomes the feed conveyor for the passive aligner.

3 Claims, 1 Drawing Sheet

CONVEYOR UNIT WITH ACCUMULATION OF RECEPTACLES SUCH AS BOTTLES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a conveyor unit with accumulation of receptacles such as bottles, comprising an accumulation table onto which a feed conveyor opens out upstream, whilst downstream, said table supplies said receptacles onto a passive aligner for leading the latter in one single row to a processing unit downstream.

This invention will find its application in the field of the conveying plants for receptacles, in particular bottles.

BACKGROUND OF THE INVENTION

In a line for conditioning a product in receptacles, such as the bottling units, these receptacles pass through various processing stations, for example through a washing unit, a bottling machine, a labeling machine, even a conditioner, between which stations these receptacles or bottles move by means of conveyors, in particular chain conveyors. In fact, these stations have production rhythms which differ from each other, so that it is necessary, at the level of the intermediate conveying, to form buffer stocks of receptacles, in addition to the fact that some of these stations require more frequent interventions than others. Therefore, in order to avoid, during such intervention, the complete stop of a plant, for example a bottling chain, accumulation tables are provided for, which allow to temporarily store the bottles proceeding from an upstream processing unit, until the end of the intervention and the downstream processing unit is re-started.

For example, from JP-A-61 051415 is known an accumulation table arranged parallel to a single-row conveyor onto which the receptacles arrive one by one. If a jamming occurs in the downstream portion of this single-row conveyor, these receptacles escape laterally on the accumulation table. Through reversing the direction of operation of the chains the latter is comprised of the stored receptacles are anew injected onto the single-row conveyor.

One understands very well that the number of bottles likely to be stored between two stations determines the time available for an operator to ensure his intervention without it being necessary to completely stop the production chain.

In brief, the more receptacles can be accumulated between two successive processing stations, the more flexible will be the use of the conditioning plant.

Obviously, this is not without some concessions. In particular, the conveying units with accumulation prove very bulky, which raises the problem of their integration into a production site where the floor occupation has to be optimized.

If we consider the particular case of an accumulation table of the type as described in WO-00/41955, it has a large capacity of passive accumulation of receptacles. However, its length associated, downstream, with that of a passive aligner for these receptacles, the aim of which is to convey the latter in one single row towards a next processing unit, most often proves too large for this aggregate to find its place in a production chain.

In this respect, though it is usual, in newly installed plants, to integrate, between two successive processing stations, conveying units with accumulation, it is increasingly more often sought to provide also the existing plants with them and, in such a case, the problem set forth above is even more obvious.

Other conveying units with accumulation are also known, which are substantially comprised of two helical conveyors nested into each other, one progressing in one direction and the other one in the opposite direction, while a transfer device is designed capable of ensuring the transfer of the receptacles accumulating on the first conveyor and proceeding from an upstream processing unit towards the second conveyor which feeds a downstream processing unit. This transfer device is capable of progressing alongside the helix between both conveyors depending on the quantity of accumulated receptacles.

The drawbacks of such an embodiment derive from its complexity. In particular, the interventions by an operator prove very difficult. Furthermore, one easily understands that, in order to allow the transfer of a receptacle from one conveyor to another, the latter may not be provided with guiding rails at their communicating lateral sides. Therefore, receptacles often fall down and the speed of progression of the latter is necessarily slow.

These units also have a problem of integration due to their size, not in length, but in width and in height, in addition to the fact that they have an accumulation capacity often much smaller than that of a table of the type as described in WO 00/41955.

BRIEF SUMMARY OF THE INVENTION

Finally, this invention has been able to cope with the above-mentioned drawbacks through a conveyor unit comprised of an accumulation table and a passive receptacle aligner which, through a particular arrangement of the latter, proves to be of a very small size taking into account the accumulation capacity it provides.

To this end, the invention relates to a conveyor unit with accumulation of receptacles such as bottles, comprising an accumulation table onto which a feed conveyor opens out upstream, whilst downstream, this table supplies said receptacles onto a passive aligner designed capable of conveying the latter in one single row to a processing unit downstream, characterized in that the passive aligner runs parallel to the accumulation table, the latter comprising, in the downstream extension thereof, a transfer conveyor, on which the receptacles are pushed laterally by a guiding rail towards said passive aligner onto a juxtaposed transition conveyor running in the opposite sense which defines the feed conveyor for said passive aligner.

BRIEF DESCRIPTION OF THE SEVERAL VIEWS OF THE DRAWINGS

The advantages resulting from this invention will become clear when reading the following description which refers to one embodiment shown in the figure of the attached drawing.

DETAILED DESCRIPTION OF THE INVENTION

Figure 1:
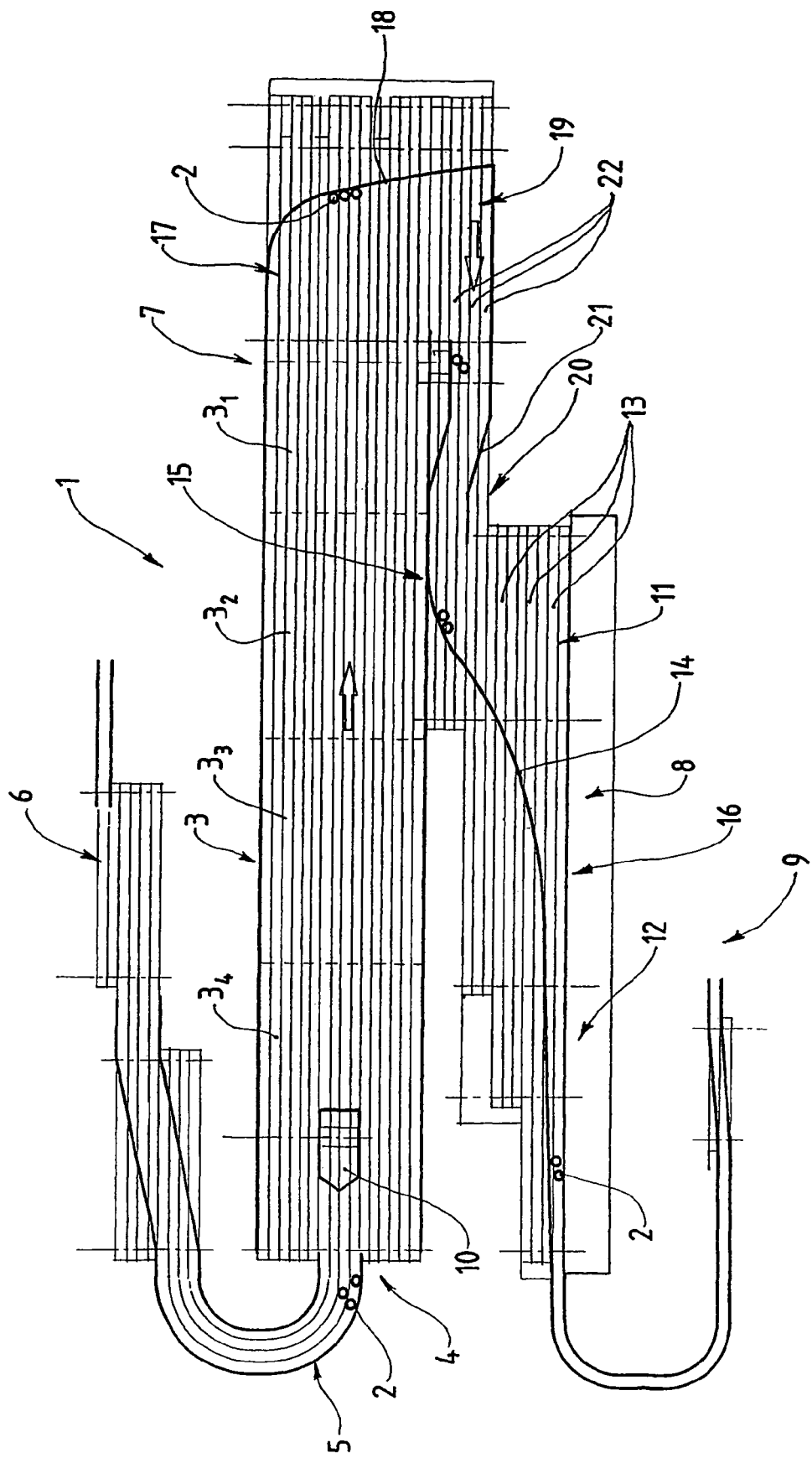
FIG. 1

As shown in this figure, this invention relates to a conveyor unit 1 with accumulation of receptacles 2, in particular bottles.

It comprises an accumulation table 3 upstream 4 of which ends a feed conveyor 5 for supplying receptacles proceeding from an upstream processing unit 6, while, in its downstream portion 7, this accumulation table 3 is designed capable of supplying the receptacles 2 onto a passive aligner 8 provided for conveying these receptacles in one single row towards a downstream processing unit 9.

Turning back to the accumulation table 3, it is of the type as described in WO.00/41955 and is comprised of chains the speed of which can be controlled so as to form, in the downstream portion 7, a buffer stock of receptacles aimed at avoiding an interruption in the supply of receptacles 2 at the level of the downstream processing unit 9.

Furthermore, on some of these chains the progression of which is stopped during the accumulation can be pushed the receptacles conveyed by the moving chains. Thus, this accumulation on the immobilized chains occurs in a passive way.

A distributor 10 placed upstream 4 of the table 3 ensures a good distribution of these receptacles over the full width of the latter.

In addition, this table 3 can have a length adjustable to the quantity of receptacles 2 that are sought to be accumulated between two processing units 6, 9. In particular, this table 3 can be comprised of one or several modules 31, 32, 33, 34.

As regards the passive aligner 8, it is also comprised of a table 11 aimed at stretching a flow of receptacles so as to bring them in one single row in the downstream portion 12.

Thus, this table 11 is formed of a juxtaposition of chains in closed circuit 13, the receptacles 2 being progressively pushed, through a guiding rail 14, from one lateral side 15 of this table 11 towards the opposite lateral side 16, taking into consideration that, in this transversal direction, the chains 13 have a progressively increasing travel speed, as a matter of fact in order to stretch the flow of receptacles 2.

According to the invention, this passive aligner 8 runs parallel to the accumulation table 3, taking into consideration that the receptacles have to move in a direction opposite their progression on this table 3. In fact, the latter includes, in the extension of its downstream portion 7, a transfer conveyor 17 topped with a guiding rail 18 that pushes the receptacles 2 sidewise onto a transition conveyor 19 with an opposite travel direction, which is directly juxtaposed to it and feeds, upstream 20, the passive aligner 8.

It is known that the longer such a passive aligner is, the lesser will be the likeliness that two receptacles will arrive side by side in its downstream portion 12. It happens to be so that, due to the shearing effect imparted by the transition conveyor 19 the travel direction is opposite that of the chains of the transfer conveyor 17, the flow of receptacles is already stretched from the beginning and the latter progress on said transition conveyor 19 in little more than two rows. Under such circumstances, it is obviously easier to nest these receptacles into each other, in order to bring them in one single row at the level of the downstream processing unit 9.

Advantageously, this transition conveyor 19 is also topped with a guiding rail 21 for pushing the receptacles slightly transversally with respect to their progression, this in a direction opposite the one which is afterwards imparted by the guiding rail 14 above the table 11 corresponding to the passive aligner 8.

In brief, by means of this guiding rail 21 those receptacles which have gone farthest to the side during their transfer are pushed back towards the row into which they must be inserted.

Advantageously, in a transversal direction and while separating from the transfer conveyor 17, the chains 22 of the transition conveyor 19 have an increasing speed gradient, this also in order to increase this effect of nesting into each other of the receptacles upstream of the passive aligner 8.

As results from the preceding description, this invention allows to have a particular compact conveyor unit for receptacles with accumulation, with a much smaller length compared to units with a classical accumulation table and a much smaller width compared to the helical conveyors with accumulation.

Compared to the latter, such conveying unit has also the peculiarity of having an accumulation capacity which can be modulated.

Accordingly, this invention advantageously solves the problem set forth.

I claim:

1. A conveyor system for accumulation of receptacles comprising:
   a feed conveyor;
   an accumulation table onto which said feed conveyor opens to at an upstream end of said accumulation table;
   a passive aligning means positioned for receiving the receptacles downstream of said accumulation table;
   a processing unit downstream of said passive aligning means, said passive aligning means for conveying the receptacles in a single row to said processing unit, said passive aligning means running parallel to said accumulation table;
   a transfer conveying means positioned downstream of said accumulation table, said transfer conveying means having a first guiding rail for pushing the receptacles laterally to said passive aligning means; and
   a transition conveying means juxtaposed by said transfer conveying means, said transition conveying means for running in a direction opposite to a direction that said transfer conveying means runs, said transition conveying means for feeding the receptacles to said passive aligning means.

2. The conveyor system of claim 1, said transition conveying means having a second guiding rail at one side thereof for urging the receptacles in a direction away from said one side, said passive aligning means having a table, said table having a third guiding rail positioned above said table of said passive aligning means.

3. The conveying system of claim 1, said transition conveying means being formed by a juxtaposition of chains that have an increasing speed gradient extending transversely thereacross.

* * * * *